Dec. 13, 1955     W. S. SUTOWSKI     2,726,899

WHEEL ASSEMBLY

Filed April 23, 1952

INVENTOR.
WALTER S. SUTOWSKI
BY

United States Patent Office 2,726,899
Patented Dec. 13, 1955

2,726,899

WHEEL ASSEMBLY

Walter S. Sutowski, Garfield Heights, Ohio

Application April 23, 1952, Serial No. 283,930

3 Claims. (Cl. 301—5.7)

My invention relates to wheel assemblies of the ball or roller bearing type for wheels to be used on roller skates, conveyors, and for similar uses.

An object of my invention is to provide an efficient and economical construction of a wheel for roller skates and roller conveyors.

Another object is to provide the improved construction of a wheel which will bear heavy loads without separation or disassembly of the parts.

Another object is the provision of a construction having bearings, races, and outer wheel construction related and arranged for strength and permanence.

Still another object is the arrangement in a wheel assembly whereby radial thrust does not separate or divide the metal portions making up the rim and web of the wheel.

A further object is the provision for proper disposition of the parts in a wheel assembly to maintain the parts in correct position with a minimum of securing means.

Figure 1:
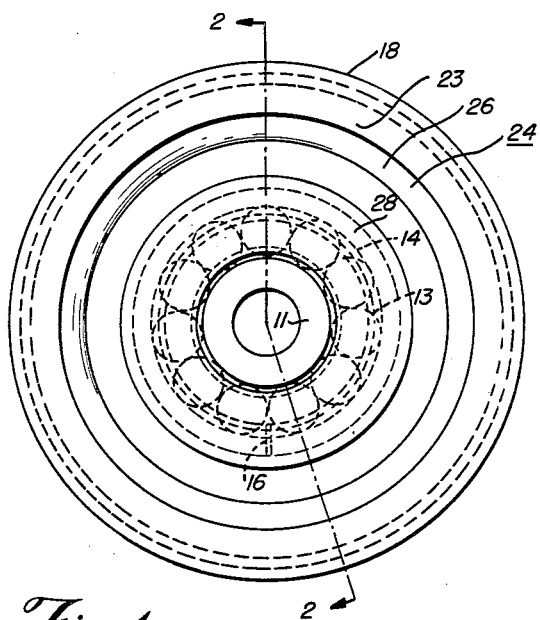
Figure 2:
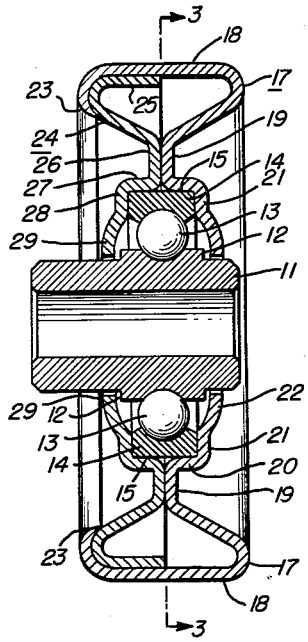
Figure 3:
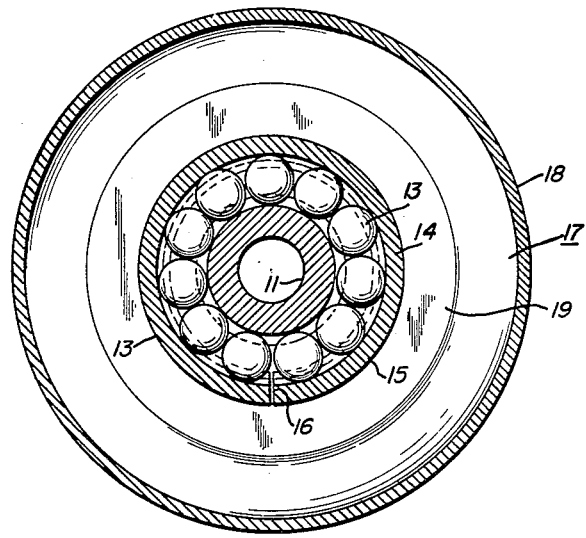

Other objects and a fuller understanding of the invention may be had by referring to the following description and claims, taken in conjunction with the accompanying drawing, in which:

Figure 1 is a side elevational view of a wheel assembly embodying my invention;

Figure 2 is a cross-sectional view of the wheel assembly shown in Figure 1 and taken along the line 2—2 and in the direction of the arrows 2—2; and Figure 3 is a cross-sectional view of the wheel assembly taken along the line 3—3 of Figure 2 and in the direction of the arrows 3—3.

In the preferred embodiment of my invention as illustrated in the drawing, 11 is the inner race member. This inner race member 11 may form the shaft or receive the shaft of a device such as a roller skate or a conveyor. The inner race member has a raceway in its outer circumferential surface as in the usual arrangement. A plurality of balls 13 arranged in the raceway, as illustrated in the drawing, provide ball bearings for the wheel assembly. Shoulders 12 are formed on the inner race member 11 on opposite sides of the raceway.

There is an outer race member 14, which is an integral piece of metal having a split 16 formed therein. The material of the outer race member is such that it is resiliently expanded to leave a gap at the split 16. It is also resiliently compressible to substantially close the gap of the split 16. Upon application of inward radially directed force on the outer race member 14, the outer race is compressed to close the gap of split 16 and thus to provide a substantially continuous raceway on the inner circumferential surface of the race member 14.

The race member 14 has an outer circumferential surface denoted by the reference character 15. This outer surface 15 is of cylindrical form, that is, it extends parallel to the axis of the wheel assembly.

A wheel is carried by the outer race member 14 to revolve relative to the inner race member. This wheel is composed of mating cup members or disks 17 and 24. The cups 17 and 24 are generally similar in form, except for the outermost portions thereof where they overlap. The cup member 17 form a rim 18. The rim 18 is of substantially cylindrical form. The cup member 17 is bent in the shape shown in Figure 2 to form a web portion 19 extending radially of the wheel. Inward of the web portion 19 there is a hub portion 20 formed by the metal of the cup portion 17 being bent and directed in an axial direction. The inner circumferential surface of the hub portion 20 is of cylindrical form and complements the outer circumferential surface 15 of the outer race member 14.

At one axial end of the wheel, the cup member 17 is bent radially inward from the hub portion 20 to form the radially extending portion 21, which engages one axial end of the outer race member 14. The cup member 17 extends radially inward from the portion 21 to form the flared skirt portion 22 which substantially covers the space between the inner and outer race members and overlaps a shoulder 12 of the inner race member 11. This skirt portion 22 acts as a dust shield, protecting the ball bearings between the two race members. There is a clearance between the skirt portion 22 of the wheel and a shoulder 12 to permit revolving of the wheel relative to the inner race member.

The other or second cup member 24 at its outer radial edge is bent over to form an underlying edge portion 25 disposed immediately within the rim portion 18. The cup member 17 has its extreme outer end bent down and inwardly to form the embracing edge portion 23. The edge portion 23 binds the two cup members 17 and 24 tightly together as shown in Figure 2 of the drawing. The inner engagement of cup members 17 and 24 by the overlapped arrangement shown in the drawing is such that the two cup members are held together to form a wheel mounted upon the bearing assembly.

The cup member 24 has a web portion 26 which corresponds to the web portion 19 of cup member 17 and also has a hub portion 27 which corresponds to the hub portion 20 of cup member 17. The hub portions 27 and 20 extend axially away from each other and together form a hub which embraces the outer race member 14 and compresses the outer race member 14 to substantially close the gap of the split 16. It is to be noted that the inner circumferential surface of the hub, comprised of hub portions 20 and 27, is of cylindrical form, that is, it extends parallel to the axis of the wheel and complements the outer surface 15 of the race member 14. The outer surface 15 of the race member 14 is engaged by the hub made up of the two hub portions 20 and 27, except at the dividing line between the two cup members.

It is to be noted that at the dividing line between the two cup members, which definies a plane at right angles to the axis of the wheel, no portion of the race member 14 extends radially outward beyond the maximum circumference of the race member at any point along its axial length. In other words, there is no portion of the outer race member extending radially outward beyond other portions of the race member at the dividing plane between the cup members.

The cup member 24 has a radially extending portion 28 corresponding to the radially extending portion 21 of the cup member 17 and this engages an axial end of the outer race member. The outer race member 14 is embraced between the radially extending portions 21 and 28 and thus held against axial movement relative to the wheel made up of the cup members. A skirt portion 29 corresponds to the skirt portion 22 of the cup member 17. The skirt portions 22 and 29 between them substantially enclose the space containing the ball bearings and provide a dust shield for the bearings. Both of the skirt portions clear the respective shoulders 12 to permit rotation of the wheel relative to the inner race member 11.

By the arrangement shown and described, it is not necessary to rivet, bolt or weld the two web portions 19 and 26 together to prevent their separation and this provides for both economy and efficiency. In some of the prior wheels of this general class, an outer race member is made up of two segments separable from each other in an axial direction. The assembled outer race member of two segments also has an outer circumferential surface so shaped and arranged that prying or wedging apart of the cup members is induced because of radial thrust forcing the wedge-shaped outer race member up within the division or separation between the cup members forming the wheel. Such prior wheel assemblies cannot take very much radial thrust without the outer race member separating, that is, the segments thereof being displaced axially apart, and also without the two cup members forming the wheel being wedged apart by the entry of the outer race member between the two cup members so as to spread the web portions apart.

In the present invention, radial thrust between the wheel made up of the two cup members and the outer race member is directly opposed by the opposed cylindrical surfaces of the hub and outer race member. Thus, in the radial thrust between the hub of my wheel assembly and the outer surface of the outer race member, there is no component of force in an axial direction. All radial force between the wheel hub and the outer race member is maintained as a radial force and is not divided to have a component of force in an axial direction. Thus, there is no force tending to force apart the two cup members and thus to separate them along the plane which is disposed at right angles to the wheel axis and between the respective web portions. The resulting wheel assembly is strong and requires a minimum of parts in order to maintain the parts together in good working condition. The wheel is not only more economical to manufacture, but is maintained in true and sound condition for a longer period of time and is more efficient in use than other wheels not embodying my invention, which persists in a true and proper form throughout heavy usage.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A wheel assembly comprising in combination an inner race member, an integral outer race member, a plurality of balls positioned between said inner and outer race members to provide ball bearings therebetween, said outer race member being split at one point in its circumference and being resiliently compressible to close said split, the outer circumferential surface of said outer race member being substantially cylindrical, and a pair of metal cup members providing the rim and web of said wheel, the said cup members having outer circumferential portions disposed in overlapping engagement to hold said cup members together, the outer circumferential portion of one of said cup members forming the rim of said wheel, said cup members radially inward of said rim uniformly extending toward each other and toward the wheel axis to form the web of said wheel, the said cup members radially inward of said web and adjacent said outer circumferential surface of said outer race member at an equal radial distance from the said wheel axis being extended away from each other and substantially parallel to said wheel axis to provide a cylindrical hub portion engaging said outer circumferential surface of said outer race member and compressing said outer race member to substantially close said split, said cup members having inner edge portions extending radially inward from said hub portion and embracing said outer race member to resist relative axial movement between said cup members and said outer race member, whereby the interaction of said hub portion and said outer circumferential surface of the outer race member is such that the radial outward components of force therebetween are maintained substantially radial in direction.

2. A ball-bearing wheel assembly having interengaged metallic disks forming the rim, web and hub part of the wheel, said disks being separable at said hub part along a plane at right angles to the wheel axis by axial force away from said plane applied to said disks at said hub part, an integral, split and resiliently compressible and expandible outer ball race having an axially extending outer circumferential surface disposed radially inward of, and embraced by, said hub part, said outer ball race having an inner circumferential surface extending radially inward uniformly on opposite sides of said plane to provide smooth bearing engagement for said balls, said disks at the opposite axial ends of said hub part at uniform axial distances from said plane and at a uniform radial distance from said wheel axis extending radially inward and embracing the opposite axial ends of said outer ball race to hold the outer ball race against axial movement relative to said disks, an integral inner ball race having an outer circumferential surface extending radially outward uniformly on opposite sides of said plane to provide smooth bearing engagement for said balls, and a plurality of ball bearings positioned between said races, said outer race being held in compressed condition by said hub part to close said split and imparting radial thrust to said disks through said hub part.

3. A ball-bearing wheel assembly having a one-piece and split outer ball bearing race, said outer race being resiliently compressible and expandible, an inner race, a plurality of ball bearings positioned between the inner and outer races, and a wheel body mounted on, and carried by, said outer race, said wheel body being comprised of interengaging mating disks, the outer peripheral portions of said disks overlapping and providing a rim for said wheel body, said disks extending radially inward and axially toward each other to engage each other along a plane disposed at a right angle to the wheel axis and forming the web of the wheel body, said disks at said plane and around said outer race extending axially away from each other to embrace said outer race and to close said split, said disks at opposite axial ends of said outer race and at an equal radial distance from the wheel axis being extended radially inward to embrace the axial ends of said outer race to hold the same against relative axial movement, the said disks thence extending radially inward from said outer race and inclined axially away from each other on opposite sides of, and at an axial distance from, said ball bearings to shield the ball bearings without engaging the same.

References Cited in the file of this patent

UNITED STATES PATENTS

| | | |
|---|---|---|
| 937,811 | Jenkins | Oct. 26, 1909 |
| 1,429,158 | Morton | Sept. 12, 1922 |
| 1,560,014 | Billings | Nov. 3, 1925 |
| 1,644,611 | Rieffert | Oct. 4, 1927 |
| 1,739,474 | Fritz et al. | Dec. 10, 1929 |
| 2,137,987 | Smith | Nov. 22, 1938 |
| 2,648,578 | Stearns et al. | Aug. 11, 1953 |